Aug. 2, 1960          L. O. CARLSEN ET AL          2,947,061
                          SPINDLE CLAMP
                   Original Filed Dec. 30, 1955
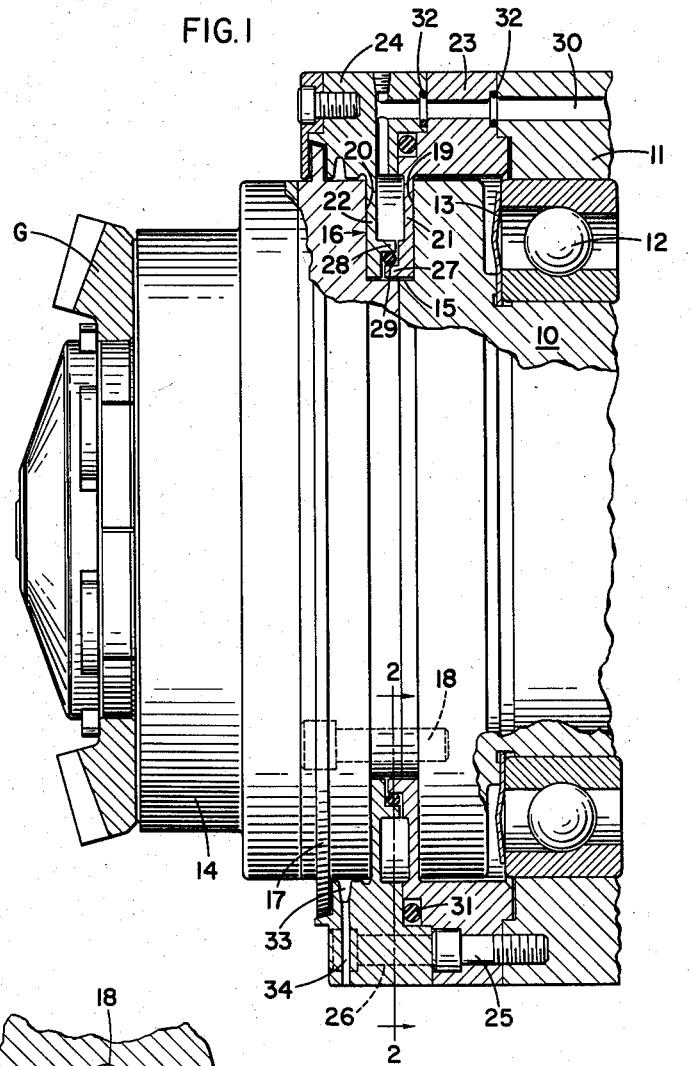
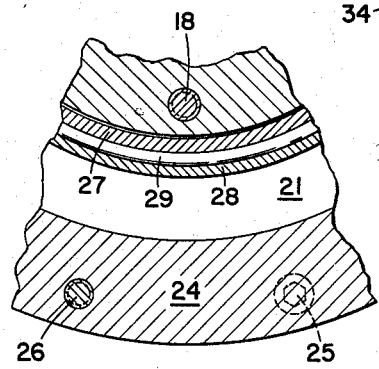
INVENTORS
LEONARD O. CARLSEN
HERMAN A. MALE
BY
ATTORNEY ID Patent Office
2,947,061
Patented Aug. 2, 1960

2,947,061

SPINDLE CLAMP

Leonard O. Carlsen, Rochester, and Herman A. Male, Brighton, N.Y., assignors to The Gleason Works, Rochester, N.Y., a corporation of New York Original application Dec. 30, 1955, Ser. No. 556,725, now Patent No. 2,812,186, dated Nov. 5, 1957. Divided and this application Jan. 18, 1957, Ser. No. 634,960

6 Claims. (Cl. 29—1)

The present invention is a division of our application Serial No. 556,725, filed December 30, 1955, now Patent No. 2,812,186, issued November 5, 1957, and relates to the work holding mechanism of a machine tool, and particularly to a hydraulically operated clamp for securing the work spindle, which for example may be the work spindle of a gear cutting machine, to its housing.

According to one aspect of the invention a gear cutting machine or the like comprises a spindle housing, a work spindle journaled for rotation in bearings in the housing and having a workpiece-supporting end portion projecting beyond said bearings, said end portion of the spindle having an annular peripheral groove, and the housing having a fluid-expansible tubular annulus fitting in said groove, the opposite side walls of the annulus being adapted for relative displacement, axially of the spindle, to clamp against the opposite walls of the groove upon expansion of the annulus by fluid under pressure.

According to another aspect of the invention a machine tool comprises a spindle assembly having a peripheral groove therein and a spindle housing assembly having a fluid-expansible annulus fitting said groove, said annulus comprising relatively flexible opposite side walls joined integrally at their outer peripheries to a rigid portion of the housing assembly, said side walls being adapted for relative flexure axially of the spindle upon expansion of the annulus to thereby grip the opposite sides of the groove, and a flexible sealing ring arranged between said side walls adjacent the inner peripheries thereof to accommodate the relative axial displacement of their inner peripheral portions incident to such flexure.

This arrangement, while adapted to clamping the spindle to the housing with enough pressure to overcome any tendency of the spindle to turn in the presence of heavy cutting loads applied to the workpiece, imposes little or no load on the spindle bearings, allows free rotation of the spindle when clamping pressure is released, and, aside from slight relative flexing of said side wall portions and their seal, has no relatively moving parts except the rotatable spindle itself.

The foregoing and other features of the invention will appear from the following description of the preferred embodiment illustrated in the accompanying drawings, wherein:

Fig. 1 is a side elevation of the front portion of a work spindle, with the workpiece carried thereby and the adjacent parts of the spindle housing appearing in vertical section; and, Fig. 2 is a fragmentary cross-section in plane 2—2 of Fig. 1.

As shown in Fig. 1 a work spindle 10 is mounted for rotation in a spindle housing 11 on anti-friction bearings, the forward one of which is shown as comprising a ball bearing 12 protected by a seal 13. Rigidly secured to the spindle is a chuck body 14 to which is clamped the workpiece, in this case a bevel ring gear G.

For the purpose of clamping the spindle to the spindle housing, the spindle is provided with a peripheral groove 15 and the spindle housing with a fluid-expansible tubular annulus 16 fitting the groove. The groove is formed between main section 10 of the spindle and a ring portion 17 of the spindle which is secured to the main section by a plurality of screws, one of which is shown at 18. The groove has plane side walls designated 19 and 20 respectively. The expansible annulus has relatively thin and resilient side walls 21 and 22 respectively formed integrally with ring-shaped sections 23 and 24 of the spindle housing 11, which sections are secured to the main section of the housing by screws 25 and 26 respectively. Preferably the sections 23 and 24 are made of steel and the parts 21 and 22 thereof are heat treated to provide the desired resilience. The side walls of the annulus have spaced overlapped flanges 27 and 28 between which is disposed a flexible O-ring seal 29. Fluid pressure is applied to the interior of the annulus through a passage 30 leading from a source of pressure and control valve means (not shown) associated with the index mechanism of the machine, which includes a notched index plate (not shown) secured to the rear end of the spindle. The arrangement is such that when the index mechanism is not operating, i.e. when the workpiece is being cut, fluid pressure is applied through passage 30 to expand the annulus 16, thereby clamping walls 21 and 22 respectively against walls 19 and 20 of the groove 15. Just prior to indexing the pressure is released and the inherent resilience of walls 21 and 22 restores them to their normal position in which the walls 19, 20 have a freely rotating or sliding fit with them. The flexible walls 21 and 22 are preferably of like dimensions so that when fluid pressure is applied to them they exert substantially equal clamping pressures on the opposed walls 19 and 20, so that no appreciable axial load is applied to the spindle and its bearings by the clamping action.

As shown the housing section 11, 23 and 24 are sealed against leakage by flexible O-ring seals 31 and 32. For protecting the clamping surfaces 19, 20, 21 and 22 against the ingress of foreign material a sealing labyrinth 33 with a vent 34 is provided.

The preferred embodiment of the invention having now been described, what is claimed is:

1. A gear cutting machine or the like comprising a spindle housing, a work spindle journaled for rotation in bearings in the housing and having a workpiece-supporting end portion projecting beyond said bearings, said end portion of the spindle having an annular peripheral groove, and the housing having a fluid-expansible tubular annulus fitting in said groove, the opposite side walls of the annulus being adapted for relative displacement, axially of the spindle, to clamp against the opposite walls of the groove upon expansion of the annulus by fluid under pressure.

2. A work holding mechanism comprising a spindle housing assembly, a work spindle assembly rotatable therein, one assembly having a peripheral groove and the other assembly having a fluid-expansible annulus fitting said groove, said annulus comprising spaced relatively flexible side wall portions joined at their outer peripheries to relatively rigid portions of said other assembly and at their inner peripheries having radially spaced telescoping flanges.

3. A work holding mechanism according to claim 2 in which there is an O-ring seal disposed between said flanges.

4. A work holding mechanism according to claim 2 in which said side wall portions are substantially alike in flexibility and effective area whereby upon fluid expansion said annulus will exert substantially equal pressures against the opposite sides of said groove.

5. A work holding mechanism according to claim 2 in which said other assembly comprises multiple sections and each of said side wall portions is integral with a different one of said sections.

6. A machine tool comprising a spindle assembly having a peripheral groove therein and a spindle housing assembly having a fluid-expansible annulus fitting said groove, said annulus comprising relatively flexible opposite side walls joined integrally at their outer peripheries to a rigid portion of the housing assembly, said side walls being adapted for relative flexure axially of the spindle upon expansion of the annulus to thereby grip the opposite sides of the groove, and a flexible sealing ring arranged between said side walls adjacent the inner peripheries thereof to accommodate the relative axial displacement of their inner peripheral portions incident to such flexure.

References Cited in the file of this patent

UNITED STATES PATENTS

| | | |
|---|---|---|
| 2,106,472 | Aikman | Jan. 25, 1938 |
| 2,143,321 | Kegreese | Jan. 10, 1939 |
| 2,666,367 | Berthiez | Jan. 19, 1954 |
| 2,712,248 | Gustafson | July 5, 1955 |
| 2,768,830 | Janson | Oct. 30, 1956 |